(12) United States Patent  
Kinoda et al.

(10) Patent No.: US 9,811,766 B2
(45) Date of Patent: Nov. 7, 2017

(54) ELECTRONIC DEVICE HAVING A DRAWABLE SECTION WITH MULTIPLE ELECTRICAL LOADS

(71) Applicants: Kazumasa Kinoda, Kanagawa (JP); Shohgo Miura, Kanagawa (JP)

(72) Inventors: Kazumasa Kinoda, Kanagawa (JP); Shohgo Miura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 14/247,712

(22) Filed: Apr. 8, 2014

(65) Prior Publication Data

US 2014/0307278 A1    Oct. 16, 2014

(30) Foreign Application Priority Data

Apr. 10, 2013 (JP) .................................. 2013-082196
Apr. 12, 2013 (JP) .................................. 2013-083964

(51) Int. Cl.
*G06K 15/00* (2006.01)
*G06K 15/16* (2006.01)
*G03G 15/00* (2006.01)
*G03G 21/16* (2006.01)

(52) U.S. Cl.
CPC ......... *G06K 15/16* (2013.01); *G03G 15/5004* (2013.01); *G03G 21/1652* (2013.01); *G03G 15/80* (2013.01)

(58) Field of Classification Search
CPC . G03G 15/5004; G03G 15/80; G03G 21/1652
See application file for complete search history.

(56) References Cited

U.S. PATENT DOCUMENTS

| | | | | |
|---|---|---|---|---|
| 9,036,323 B1* | 5/2015 | White | ..................... | H02H 1/04 361/218 |
| 2005/0283403 A1* | 12/2005 | Ramirez | ................ | G06Q 20/20 705/16 |
| 2009/0050684 A1* | 2/2009 | Crockett | ................ | G06Q 20/20 235/375 |
| 2011/0064427 A1* | 3/2011 | Yoshida | ................ | B65H 43/04 399/21 |
| 2011/0210502 A1* | 9/2011 | Fujita | .................... | B65H 5/062 271/258.01 |

(Continued)

FOREIGN PATENT DOCUMENTS

JP    04-101255    4/1992
JP    05327963 A    12/1993

(Continued)

*Primary Examiner* — Benjamin O Dulaney
(74) *Attorney, Agent, or Firm* — Duft Bornsen & Fettig LLP

(57) ABSTRACT

An electronic device includes a controller and a unit section. The controller is configured to control operation of the electronic device. The unit section is drawable from a main body of the electronic device on which multiple loads and the controller are mounted. The unit section includes a first load, a second load, and a third load. Each of the first load and the second load is connected to a serial communication unit that enables serial communication with the control unit. The third load is connected to a communication line used for communication with the controller, without being connected to the serial communication unit.

15 Claims, 13 Drawing Sheets

(56) References Cited

U.S. PATENT DOCUMENTS

| | | | | |
|---|---|---|---|---|
| 2013/0100219 A1* | 4/2013 | Tokisawa | ............... | B41J 11/006 |
| | | | | 347/102 |
| 2013/0256980 A1* | 10/2013 | Mizuno | ................... | B65H 1/00 |
| | | | | 271/162 |
| 2014/0055016 A1* | 2/2014 | Nishikawa | ........... | H05K 5/0247 |
| | | | | 312/223.6 |

FOREIGN PATENT DOCUMENTS

| | | |
|---|---|---|
| JP | 2001-038982 | 2/2001 |
| JP | 2004326027 A | 11/2004 |
| JP | 2005-003894 | 1/2005 |
| JP | 2005-043604 | 2/2005 |
| JP | 2005-049369 | 2/2005 |
| JP | 2009-148994 | 7/2009 |

\* cited by examiner

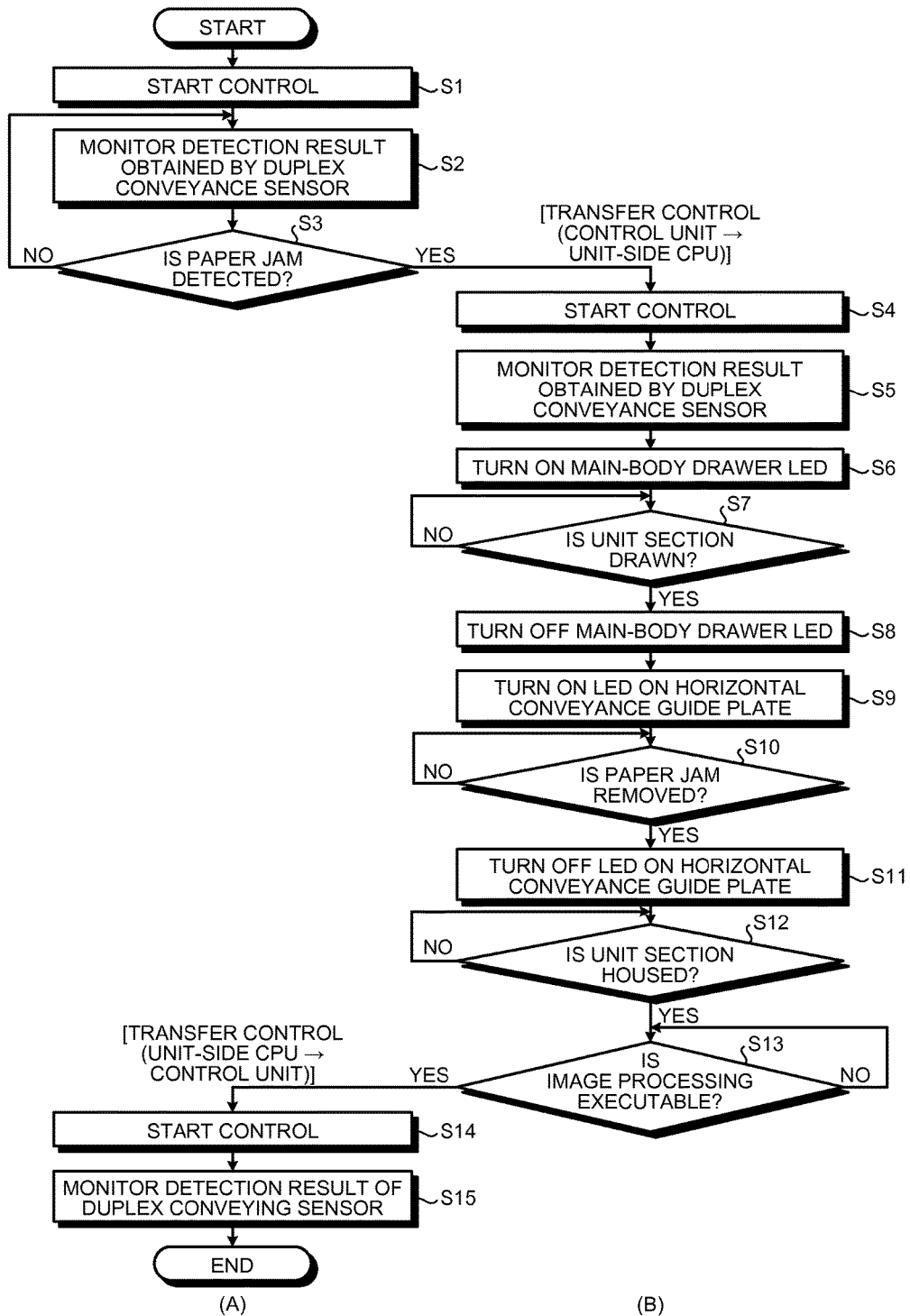

ELECTRONIC DEVICE HAVING A DRAWABLE SECTION WITH MULTIPLE ELECTRICAL LOADS

CROSS-REFERENCE TO RELATED APPLICATIONS

The present application claims priority to and incorporates by reference the entire contents of Japanese Patent Application No. 2013-082196 filed in Japan on Apr. 10, 2013 and Japanese Patent Application No. 2013-083964 filed in Japan on Apr. 12, 2013.

BACKGROUND OF THE INVENTION

1. Field of the Invention

The present invention relates to an electronic device, an image forming apparatus, and a control method.

2. Description of the Related Art

Conventionally, an image processing apparatus including multiple units that are drawable from a main body has been provided. In such an image processing apparatus, as a method to electrically connect the units and the main body of the image processing apparatus, a method to directly connect them by using a bundled wire that enables parallel communication or a bundled wire that enables serial communication has been employed.

However, in the conventional connection method, if the bundled wire that enables parallel communication is used, the number of cores of the bundled wire increases, so that the area occupied by the bundled wire is increased and too much space is used in the main body. Furthermore, as described in Japanese Patent Application Laid-open No. 2001-38982, if the bundled wire that enables serial communication is used, the number of cores of the bundled wire decreases and the area occupied by the bundled wire is reduced, but it becomes difficult to deal with the responsiveness needed for a control process between the units and the main body of the image processing apparatus. As described above, in the conventional connection method, it is difficult to reduce the area occupied by the bundled wire and deal with the responsiveness to the control process simultaneously.

Therefore, there is a need for an electronic device, an image forming apparatus, and a control method capable of ensuring a space in the main body and dealing with the responsiveness needed for a control process between units and a main body.

SUMMARY OF THE INVENTION

According to an embodiment, an electronic device includes a controller and a unit section. The controller is configured to control operation of the electronic device. The unit section is drawable from a main body of the electronic device on which multiple loads and the controller are mounted. The unit section includes a first load, a second load, and a third load. Each of the first load and the second load is connected to a serial communication unit that enables serial communication with the control unit. The third load is connected to a communication line used for communication with the controller, without being connected to the serial communication unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a flowchart illustrating the flow of a control process according to the modification.

DETAILED DESCRIPTION OF THE PREFERRED EMBODIMENTS

Embodiments of an electronic device and an image forming apparatus according to the present invention will be explained in detail below with reference to the accompanying drawings. In the embodiments below, an image forming apparatus according to the present invention is applied to a tandem-type color copier as an example; however, the present invention is not limited to the embodiments. The image forming apparatus according to the present invention may be applied to any apparatuses that form images in an electrophotographic system, regardless of whether the apparatuses are monochrome types or color types. For example, the image forming apparatus may be applied to a printer or a multifunction peripheral (MFP) of an electrophotographic system. Incidentally, the multifunction peripheral is an apparatus having at least two of a printing function, a copying function, a scanner function, and a facsimile function.

First Embodiment

Figure 1:
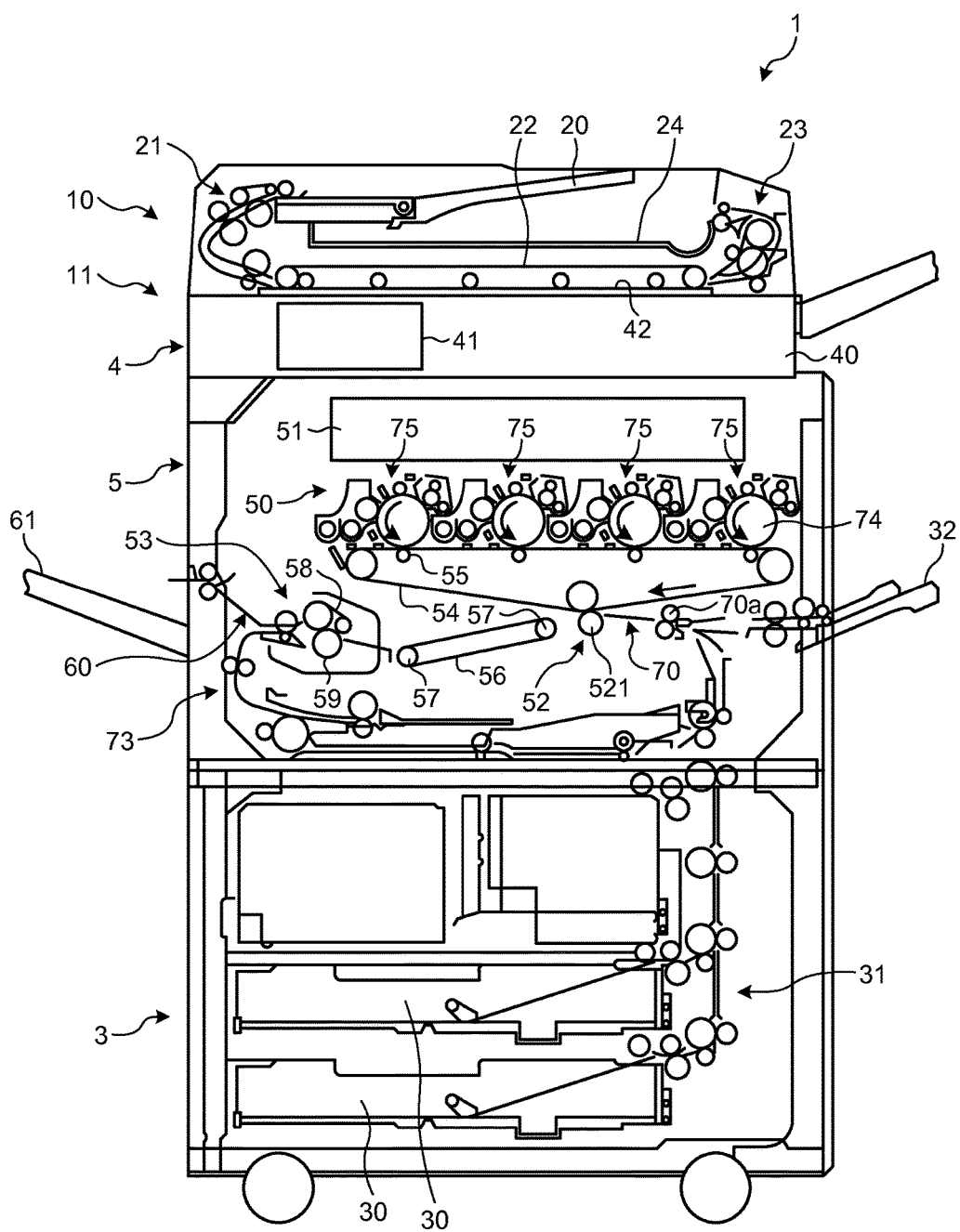
FIG. 1 is a diagram illustrating a configuration example of an image forming apparatus according to an embodiment.

FIG. 1 is a diagram illustrating a configuration example of an image forming apparatus 1 according to a first embodiment. As illustrated in FIG. 1, the image forming apparatus 1 includes an auto document feeder (ADF) 10 and an apparatus main-body 11. The apparatus main-body 11 includes a sheet feed unit 3, an image reading unit 4, and an apparatus main-body unit 5.

The ADF 10 includes a document tray 20, a document feed roller 21, a document conveying belt 22, a document discharge roller 23, and a document discharge tray 24. The ADF 10 is attached to the image reading unit 4 via an opening/closing mechanism (not illustrated), such as a hinge, so as to be opened and closed.

The document feed roller 21 separates each document (not illustrated) from a bundle of documents stacked on the document tray 20, and conveys each document toward the image reading unit 4. The document conveying belt 22 conveys the document separated by the document feed roller 21 to the image reading unit 4. The document discharge roller 23 discharges, to the document discharge tray 24 below the document tray 20, the document that has been discharged from the image reading unit 4 by the document conveying belt 22.

The image reading unit 4 includes a casing 40, a scanning optical unit 41, a contact glass 42, and a driving unit (not illustrated). The scanning optical unit 41 is provided inside the casing 40 and includes a light emitting diode (LED) unit. The scanning optical unit 41 emits light from the LED unit in the main-scanning direction, and is caused to perform scanning in the sub-scanning direction in an entire irradiation area by the driving unit. Therefore, the scanning optical unit 41 reads a two-dimensional color image of the document. Incidentally, the scanning optical unit 41 may include a different light-emitting element unit, such as an "organic electroluminescence (EL) unit", instead of the "LED unit".

The contact glass 42 is arranged in an upper portion of the casing 40 of the image reading unit 4, and forms a top surface of the casing 40. The driving unit includes wires (not illustrated) fixed to the scanning optical unit 41, multiple driven pulleys (not illustrated) and driving pulleys (not illustrated) extended between the wires, and a motor that rotates the driving pulleys.

The sheet feed unit 3 includes sheet feed cassettes 30 and a sheet feed unit 31. Each of the sheet feed cassettes 30 houses sheets (not illustrated), as recording media, of a different sheet size. The sheet feed unit 31 conveys each of the sheets housed in the sheet feed cassette 30 to a main conveying path 70 of the apparatus main-body unit 5.

Furthermore, a manual feed tray 32 is arranged on the side surface of the apparatus main-body unit 5 so as to be opened and closed with respect to the apparatus main-body unit 5, and a bundle of sheets is manually fed on the top surface of the tray when the tray is opened with respect to the apparatus main-body unit 5. The topmost one of the manually-fed sheets is delivered by a delivery roller of the manual feed tray 32 toward the main conveying path 70.

The main conveying path 70 includes a registration roller pair 70a. Rollers of the registration roller pair 70a sandwich the sheet conveyed along the main conveying path 70, and convey the sheet to a secondary transfer nip at a predetermined timing.

The apparatus main-body unit 5 includes an exposing unit 51, a tandem image forming device 50, an intermediate transfer belt 54, an intermediate transfer roller 55, a secondary transfer device 52, a fixing unit 53, and the like. Furthermore, the apparatus main-body unit 5 includes the main conveying path 70, a reverse conveying path 73, and a sheet discharge path 60. Namely, multiple loads are mounted on the apparatus main-body unit 5. In this example, the apparatus main-body unit 5 may correspond to a "main body" in the appended claims. Furthermore, from a different perspective view, the apparatus main-body 11 may correspond to the "main body" in the appended claims.

As illustrated in FIG. 1, the exposing unit 51 is arranged adjacent to the tandem image forming device 50. The exposing unit 51 exposes photoconductor drums 74 provided for different colors. The tandem image forming device 50 includes four image forming units 75 for yellow, cyan, magenta, and black arranged above the intermediate transfer belt 54 in a rotation direction of the intermediate transfer belt 54. Each of the image forming units 75 includes, although details are not illustrated in the drawings, a charging device, a developing device, a photoconductor cleaning device, a neutralizing device, and the like around the photoconductor drum 74 provided for each of the colors as described above. Furthermore, each of the photoconductor drums 74 and the above units arranged around the photoconductor drum forms a unit as a single process cartridge.

In the tandem image forming device 50, visible images (toner images) are formed with toner of the different colors on the respective photoconductor drums 74 based on pieces of image information read and separated by colors by the image reading unit 4. Furthermore, the visible image formed on each of the photoconductor drums 74 is transferred to the intermediate transfer belt 54 between each of the photoconductor drums 74 and the intermediate transfer roller 55.

On the opposite side of the tandem image forming device 50 across the intermediate transfer belt 54, a secondary transfer device 52 is arranged. The secondary transfer device 52 includes a secondary transfer roller 521 serving as a transfer member. By pressing the secondary transfer roller 521 against the intermediate transfer belt 54, the secondary transfer nip is formed. The secondary transfer nip is configured so that the toner images formed on the intermediate transfer belt 54 can be transferred to a sheet conveyed from the sheet feed unit 3 through the main conveying path 70.

The sheet on which the toner images are transferred at the secondary transfer nip is conveyed to the fixing unit 53 by a sheet conveying belt 56 stretched between two support rollers 57.

The fixing unit 53 is configured such that a pressing roller 59 is pressed against a fixing belt 58 that is an endless belt. The fixing unit 53 causes the pressing roller 59 to apply heat and pressure to the sheet to thereby melt the toner of the toner images transferred on the sheet and fix the toner images, as a color image, on the sheet.

The sheet on which the color image is fixed as described above is stacked on a discharge tray 61 outside the image forming apparatus via the sheet discharge path 60 serving as a path for discharging sheets.

Furthermore, as illustrated in FIG. 1, the reverse conveying path 73 is arranged below the secondary transfer device 52 and the fixing unit 53. The reverse conveying path 73 is used to reverse the sheet discharged from the fixing unit 53 and feeds the reversed sheet to the secondary transfer device 52 again through the main conveying path 70 in order to form images on both sides of the sheet.

Furthermore, multiple sheet detection sensors serving as paper jam detecting means are arranged on the main conveying path 70 and the reverse conveying path 73 along the conveying paths. Incidentally, the number and the arrangement positions of the sheet detection sensors are set appropriately. If each of the sheet detection sensors does not detect passage of a sheet within a predetermined time, each of the sheet detection sensors recognizes that a paper jam has occurred, and notifies a display unit (not illustrated) or the like in the image forming apparatus 1 of occurrence of the paper jam.

Moreover, the image forming apparatus 1 according to the present embodiment includes a unit section 76 (described hereinafter) that holds the secondary transfer device 52, the fixing unit 53, the main conveying path 70, the sheet discharge path 60, the reverse conveying path 73, and the like illustrated in FIG. 1 and that is drawable from the apparatus main-body unit 5. Furthermore, in this example, a control unit 100 (described hereinafter) that controls entire operation of the image forming apparatus 1 is housed in the apparatus main-body unit 5. Incidentally, while the image forming apparatus 1 including the image reading unit 4 is explained in this example, it may be possible to employ a so-called printer that does not include the image reading unit 4 or the like.

Figure 2:
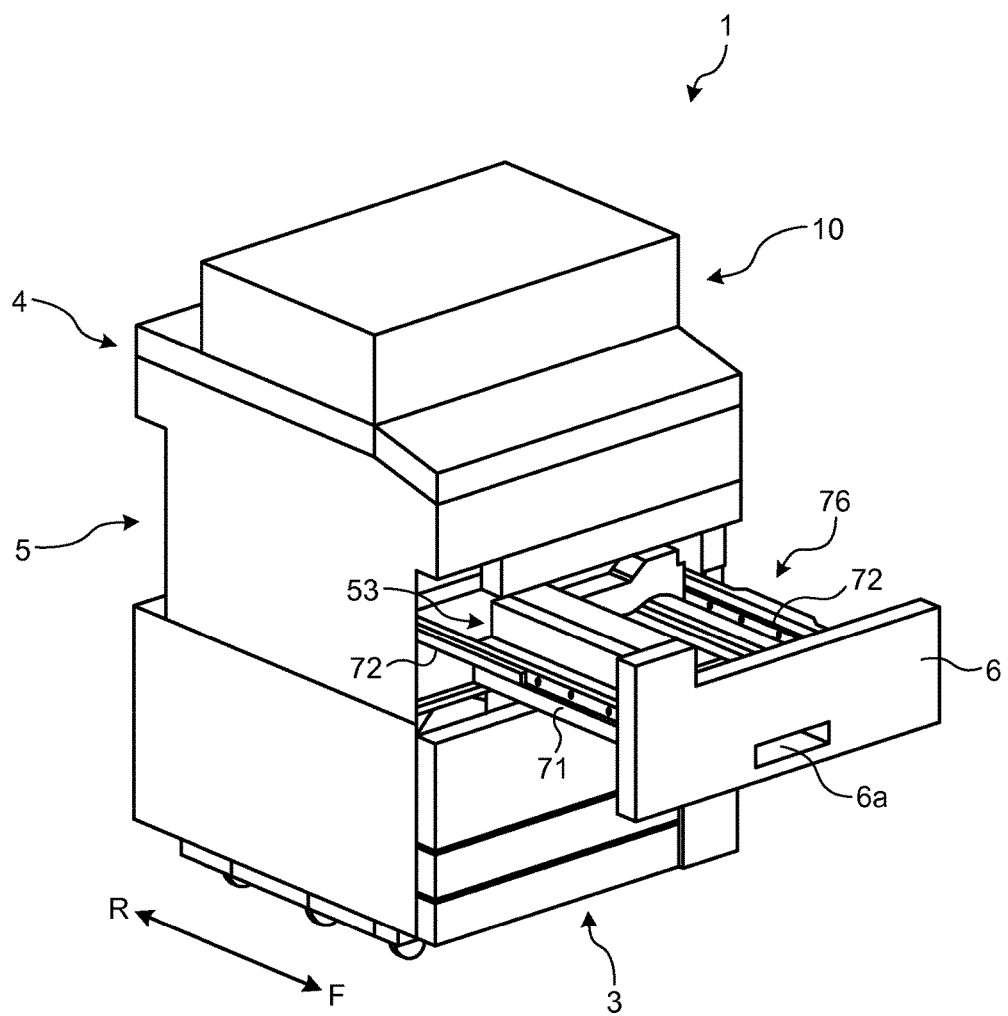
FIG. 2 is a perspective view of a unit section drawn from an apparatus main-body unit.

FIG. 2 is a perspective view illustrating the unit section 76 drawn from the apparatus main-body unit 5. The unit section 76 includes a carrier 71 for holding the secondary transfer device 52, the fixing unit 53, the main conveying path 70, and the reverse conveying path 73, and includes various loads, such as motors or sensors, mounted thereon. Furthermore, a front cover 6 is attached to the carrier 71. Moreover, the carrier 71 is supported by rails 72 arranged in the apparatus main-body unit 5 so as to be able to move in the back and forth direction (arrow F-R in FIG. 2) with respect to the apparatus main-body unit 5. When a user moves the front cover 6 in the back and forth direction (arrow FR in FIG. 2) with respect to the apparatus main-body unit 5 by gripping a handle 6a arranged on the front cover 6, the unit section 76 is drawn from the apparatus main-body unit 5.

Conventionally, the unit section 76 and the apparatus main-body unit 5 are connected only via wire communication connectors (drawer connectors) that connect the unit section 76 and the apparatus main-body unit 5 with wires under the state that the unit section 76 is housed in the apparatus main-body unit 5, and if the unit section 76 is drawn, the connection via the drawer connectors is disconnected and it becomes impossible to drive each of the loads mounted on the unit section 76. However, a number of loads need to be operated while the unit section is being drawn, and therefore, there is a need to connect the apparatus main-body unit 5 and the loads that need to be operated while the unit section is being drawn. In this case, if communication lines to enable communication with the apparatus main-body unit 5 are connected to all of the loads mounted on the drawable unit section 76, the diameter of a bundled wire that is a bundle of the communication lines and power wires increases. Therefore, there is a need to provide a method to make the bundled wire thinner and connect the apparatus main-body unit 5 and the unit section 76 simultaneously.

Figure 3:
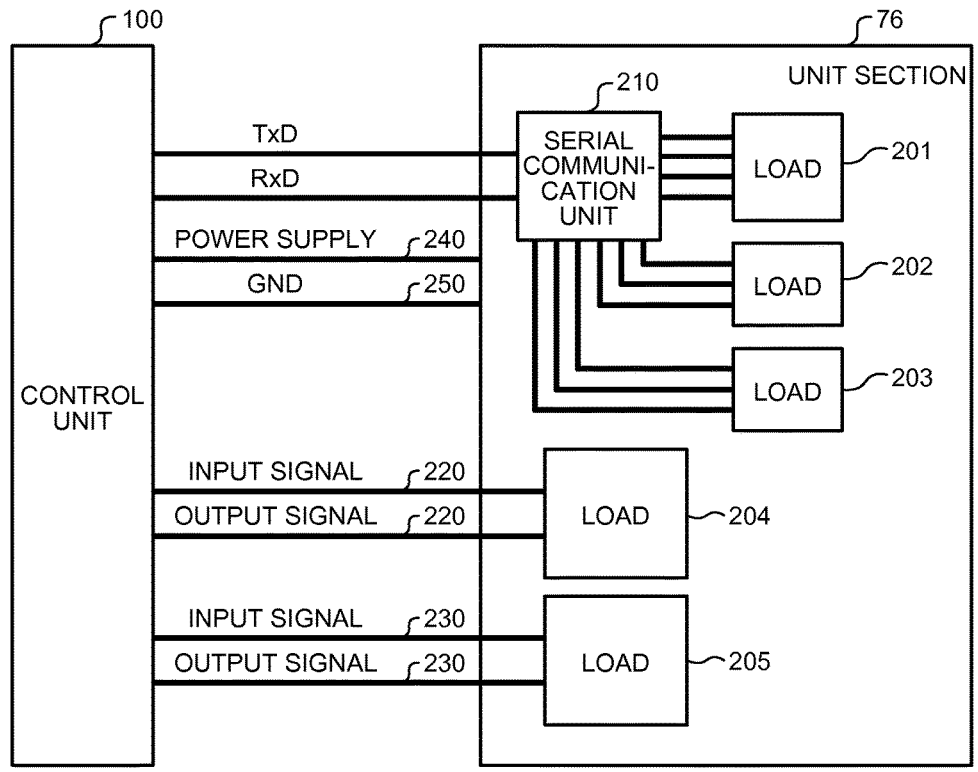
FIG. 3 is a schematic diagram illustrating an example of a connection configuration of a control unit and a unit section.

FIG. 3 is a schematic diagram illustrating an example of a connection configuration of the control unit 100 and the unit section 76 according to the present embodiment. The control unit 100 is a device that integrally controls the entire operation of the image forming apparatus 1. In the present embodiment, the control unit 100 employs a hardware configuration of a normal computer device including a central processing unit (CPU), a read only memory (ROM), a random access memory (RAM), and the like, and the CPU loads programs stored in the ROM or the like into the RAM and executes the programs to thereby control various types of operation of the image forming apparatus 1. The unit section 76 is drawable from the apparatus main-body unit 5, and includes various loads, such as motors and sensors, mounted thereon. In the example in FIG. 3, five loads (loads 201 to 205) are mounted on the unit section 76; however, the present invention is not limited to this example.

As illustrated in FIG. 3, the unit section 76 includes a serial communication unit 210 that performs serial communication with the control unit 100. The serial communication unit 210 is connected to the control unit 100 via serial communication lines TxD and RxD used for the serial communication with the control unit 100. In the example in FIG. 3, each of the load 201, the load 202, and the load 203 is connected to the serial communication unit 210. The serial communication unit 210 and the control unit 100 are connected to each other via the serial communication, and the serial communication unit 210 converts a serial signal received from the control unit 100 into a parallel signal and supplies the parallel signal to each of the loads. In the example in FIG. 3, the multiple loads (the load 201, the load 202, and the load 203) are connected to the control unit 100 via the serial communication unit 210 that performs the serial communication with the control unit 100. Therefore, it becomes possible to reduce the number of electrical wires to be used, as compared with a configuration in which a dedicated communication line for individually enabling communication with the control unit 100 is provided for each of the loads. As a result, it becomes possible to ensure a storage space of a bundled wire that connects the apparatus main-body unit 5 and the unit section 76.

In the connection via the serial communication, transmission efficiency and speed are lowered as compared with a case in which the communication line is provided for each of the loads to establish connection with the control unit 100 (each of the loads and the control unit 100 are directly connected), and it is difficult to simultaneously exchange signals between the control unit 100 and each of the loads. Some of the loads, such as motors or sensors, need to exchange signals simultaneously, that is, need to be directly connected to the control unit 100, in order to give priority to the transmission efficiency and the speed. In the example in FIG. 3, as for the loads that need to be directly connected to the control unit 100, the communication line is provided for each of the loads to establish connection with the control unit 100.

In the example in FIG. 3, the load 204 and the load 205 are loads that need to be directly connected to the control unit 100. The load 204 is connected to the control unit 100 via communication lines 220 (in the example in FIG. 3, a communication line used for communication of input signals and a communication line used for communication of output signals) for independently enabling communication between the load 204 and the control unit 100. Furthermore, the load 205 is connected to the control unit 100 via communication lines 230 (in the example in FIG. 3, a communication line used for communication of input signals and a communication line used for communication of output signals) for independently enabling communication between the load 205 and the control unit 100. Moreover, in the example in FIG. 3, a power wire 240 for supplying a power-supply voltage and a grounding wire 250 for supplying a ground voltage (reference voltage) GND are connected between the control unit 100 and the unit section 76.

With the above configuration, it becomes possible to reduce the number of electrical wires to be used and simultaneously drive loads that need to be responsive (loads that need to be directly connected to the control unit 100).

Furthermore, as compared with a case in which the electrical wires are connected to all of the loads, it becomes possible to ensure a storage space of the bundled wire that connects the apparatus main-body unit 5 and the unit section 76 and reduce the number of components, enabling to improve economical efficiency and reduce environmental loads. Moreover, in the example in FIG. 3, the communication line used for communication of input signals and the communication line used for communication of output signals are connected to each of the load 204 and the load 205; however, the present invention is not limited to this example. It may be possible to connect only the communication line used for communication of input signals or the communication line used for communication of output signals. Furthermore, the power wire for supplying a power-supply voltage and the grounding wire for supplying the ground voltage GND may be directly connected to each of the load 204 and the load 205.

Examples of the unit section 76 include a conveying unit having a function to convey a recording medium, such as a recording sheet, and a sheet feed unit having a function to supply the recording medium. Furthermore, it may be possible to employ a post-processing unit that has a function to receive a sheet (recording sheet) on which an image is formed and to perform post-processing, such as punching, aligning, stapling, folding, or binding, on the sheet.

The serial communication unit 210 converts serial communication to parallel communication, and may perform the conversion by using a dedicated device or by a CPU.

In the example in FIG. 3, each of the load 201, the load 202, and the load 203 is a load for which the transmission efficiency and the speed are not prioritized (loads that need not be directly connected to the control unit 100), and may correspond to a "first load" or a "second load" in the appended claims. Furthermore, each of the load 204 and the load 205 is a load for which the transmission efficiency and the speed are prioritized (loads that need to be directly connected to the control unit 100), and may correspond to a "third load" in the appended claims. In the example in FIG. 3, the five loads (the load 201 to the load 205) are mounted on the unit section 76; however, the present invention is not limited to this example. Namely, it is sufficient to mount at least the first load, the second load, and the third load on the unit section 76, connect each of the first load and the second load to the serial communication unit 210, and connect the third load to a communication line that is provided in accordance with the third load to enable communication with the control unit 100 without connecting the third load to the serial communication unit 210.

Figure 4:
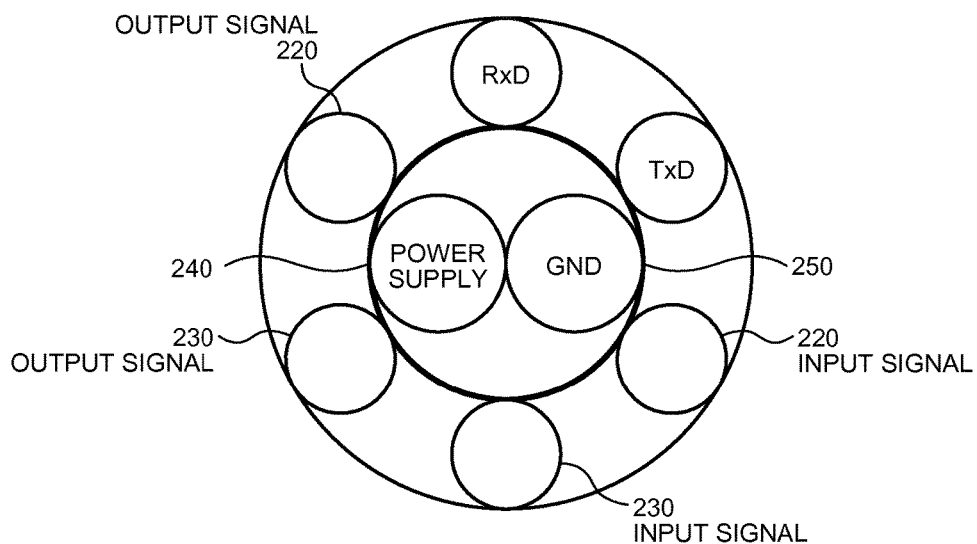
FIG. 4 is a cross-sectional view schematically illustrating an example of a bundled wire.

FIG. 4 is a cross-sectional view schematically illustrating an example of a bundled wire in which the electrical wires (the serial communication lines (TxD and RxD), the communication lines 220, the communication lines 230, the power wire 240, and the grounding wire 250) illustrated in FIG. 3 are bundled. In the example in FIG. 4, the power wire 240 and the grounding wire 250 are arranged in the center of the bundled wire; however, the configuration is not limited to this example.

Figure 5:
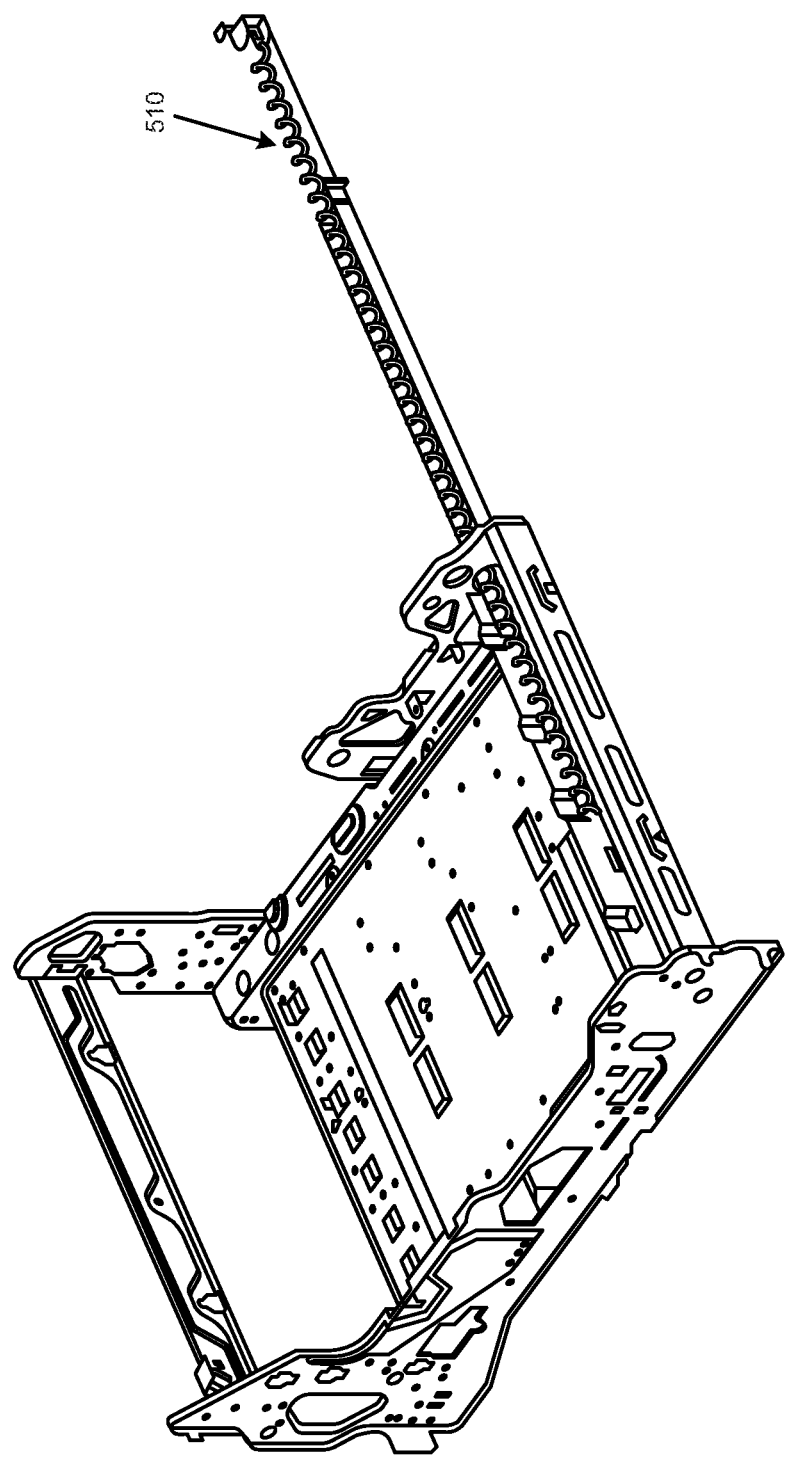
FIG. 5 is a perspective view illustrating a state in which the unit section illustrated in FIG. 2 is drawn out of the main-body unit.

FIG. 5 is a perspective view illustrating a state in which the unit section illustrated in FIG. 2 is drawn out of the main-body unit. As a space for storing the bundled wire for connecting the unit section and the main-body unit, a portion 510 is provided. However, if the bundled wire is to be stored in this portion, the diameter of the bundle is limited. To cope with this, in the present embodiment, the diameter of the bundled wire is reduced by using the connection via the serial communication as explained above with reference to FIG. 3. However, among the loads mounted on the unit section, some of the loads need to be responsive and some of the loads need to be driven simultaneously. Therefore, in the present embodiment, loads that need not be directly connected to the apparatus main-body unit 5 (the control unit 100) (loads for which the transmission efficiency and the speed are not prioritized and which need not be driven simultaneously) are connected to the apparatus main-body unit 5 by using the connection via the serial communication, while a dedicated communication line is provided for each of the loads that need to be directly connected to the apparatus main-body unit 5 and these loads are connected to the apparatus main-body unit 5 via the communication lines. Therefore, it becomes possible to reduce the diameter of the bundled wire and drive the loads that need to be responsive or the loads that need to be driven simultaneously.

First Modification of First Embodiment

Figure 6:
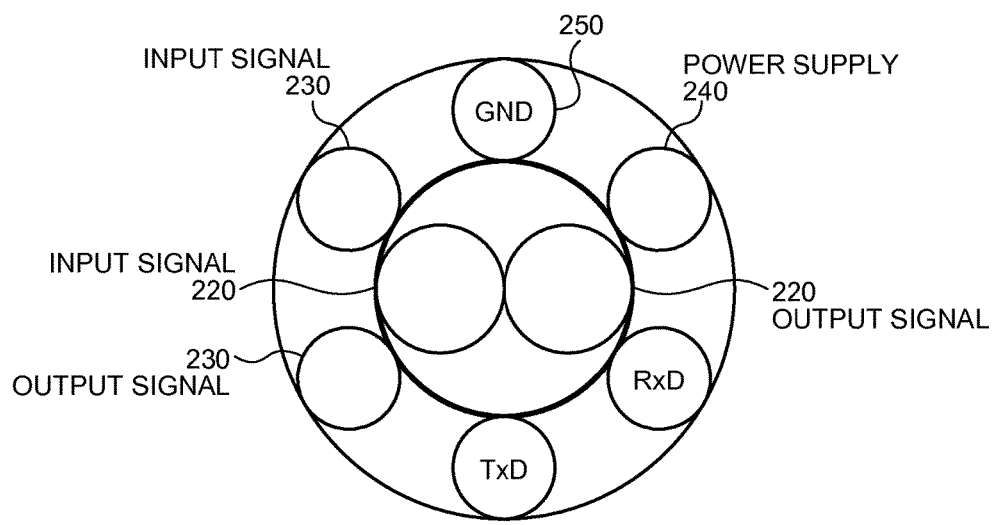
FIG. 6 is a cross-sectional view schematically illustrating another example of the bundled wire.

FIG. 6 is a cross-sectional view schematically illustrating another example of the bundled wire in which the electrical wires (TxD, RxD, the communication lines 220, the communication lines 230, the power wire 240, and the grounding wire 250) illustrated in FIG. 3 are bundled. In the example in FIG. 6, the communication lines 220 for directly connecting the control unit 100 and the load 204 are arranged in the center of the bundled wire; however, the configuration is not limited to this example. For example, the communication lines 230 for directly connecting the control unit 100 and the load 205 may be arranged in the center.

Second Modification of First Embodiment

Figure 7:
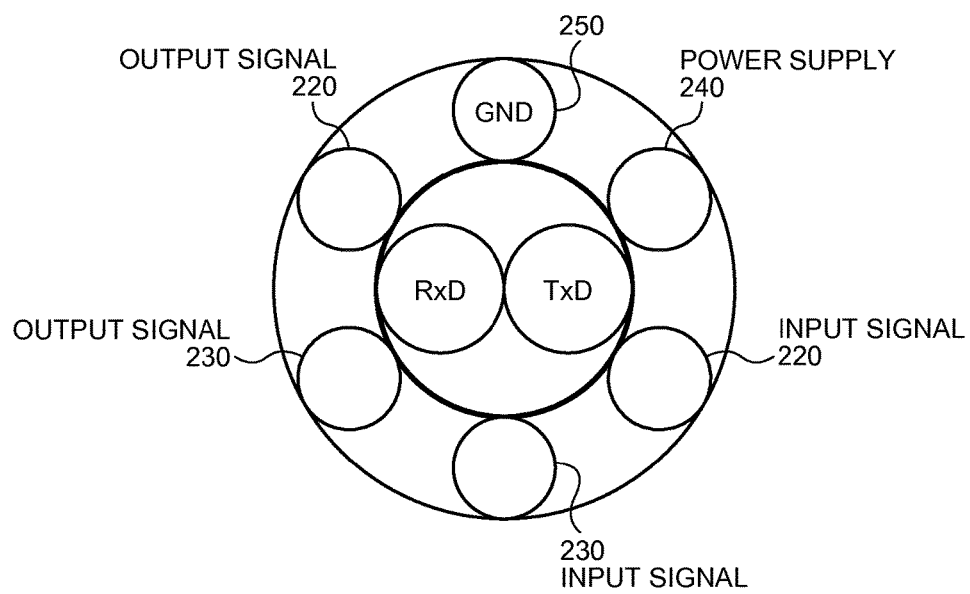
FIG. 7 is a cross-sectional view schematically illustrating another example of the bundled wire.

FIG. 7 is a cross-sectional view schematically illustrating another example of the bundled wire in which the electrical wires (TxD, RxD, the communication lines 220, the communication lines 230, the power wire 240, and the grounding wire 250) illustrated in FIG. 3 are bundled. In the example in FIG. 7, the serial communication lines (TxD and RxD) used for serial communication between the control unit 100 and the serial communication unit 210 are arranged in the center of the bundled wire.

Second Embodiment

Next, a second embodiment will be explained. The second embodiment differs from the first embodiment in that it includes a wire communication unit that connects, with wires, the control unit 100 and the loads for which the transmission efficiency and the speed are not prioritized (the load 201, the load 202, and the load 203) under the state that the unit section 76 is housed in the apparatus main-body unit 5. Detailed explanation will be given below. Explanation of the same components as those of the first embodiment described above will be omitted appropriately.

Figure 8:
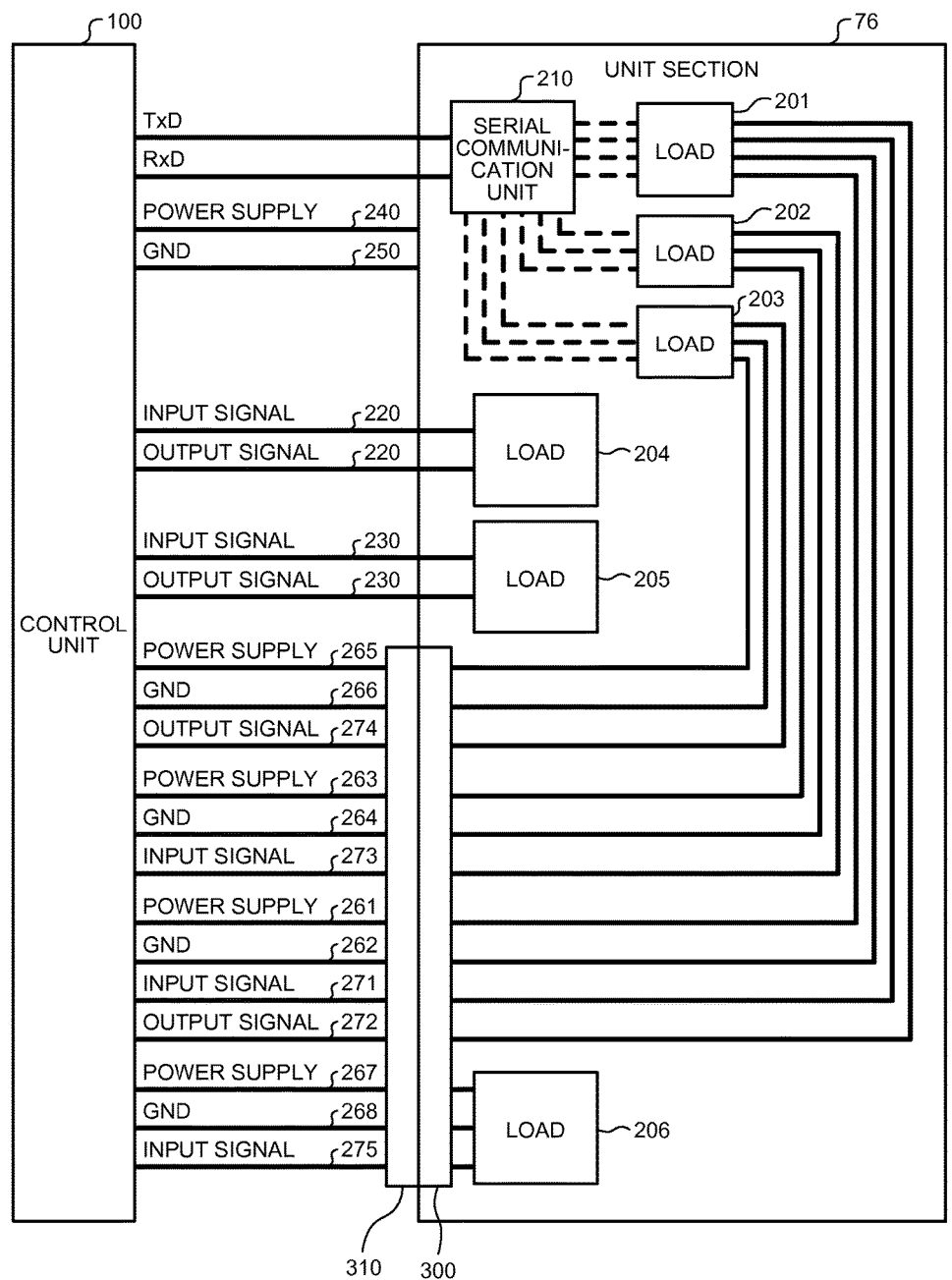
FIG. 8 is a schematic diagram illustrating an example of the connection configuration of the control unit and the unit section.
Figure 9:
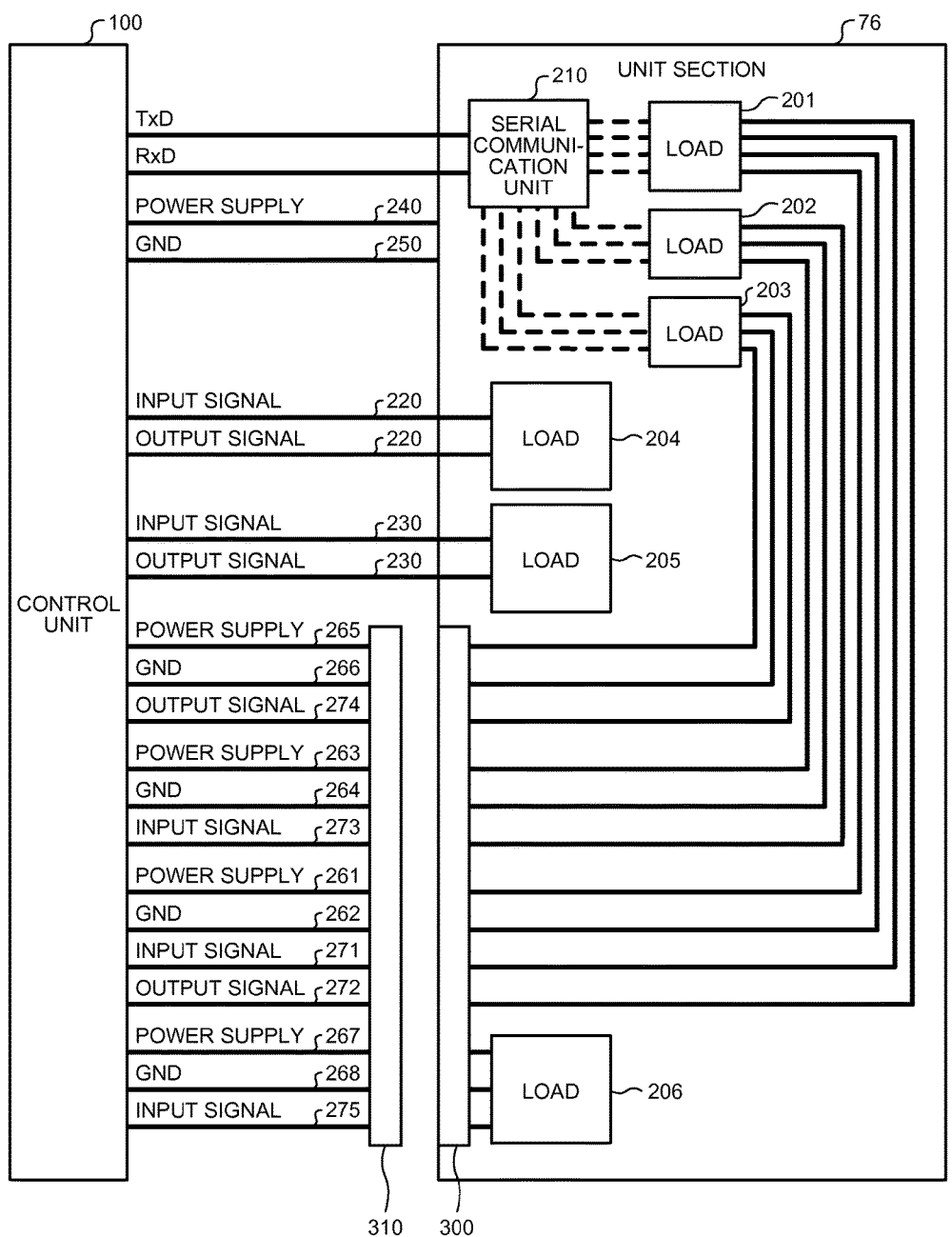
FIG. 9 is a schematic diagram illustrating an example of the connection configuration of the control unit and the unit section.

FIG. 8 and FIG. 9 are schematic diagrams illustrating an example of a connection configuration of the control unit 100 and the unit section 76 according to the present embodiment. In the example in FIG. 8 and FIG. 9, the unit section 76 includes a load 206, in addition to the five loads (the load 201 to the load 205) as described above. Furthermore, in this example, wire communication connectors 300 and 310 are provided to connect each of the load 201, the load 202, and the load 203 to the control unit 100 under the state that the unit section 76 is housed in the apparatus main-body unit 5 (see FIG. 8), and to disconnect the wire connection between each of the load 201, the load 202, and the load 203 and the control unit 100 under the state that the unit section 76 is drawn from the apparatus main-body unit 5 (see FIG. 9). In this example, the wire communication connector on the unit section 76 side is denoted by 300, and the wire communication connector on the control unit 100 side is denoted by 310. In this example, the wire communication connectors 300 and 310 may correspond to a "wire communication unit" in the appended claims.

Furthermore, each of the load 201, the load 202, and the load 203 is connected to the serial communication unit 210. As illustrated in FIG. 8, each of the load 201, the load 202, and the load 203 connected to the control unit 100 via the wire communication connectors (300 and 310) communicate with the control unit 100 via the wire communication connectors (300 and 310) under the state that the unit section 76 is housed in the apparatus main-body unit 5. In this case, each of the load 201, the load 202, and the load 203 connected to the control unit 100 via the wire communication connectors (300 and 310) does not perform communication with the control unit 100 via the serial communication unit 210.

In the example in FIG. 8, under the state that the unit section 76 is housed in the apparatus main-body unit 5 (under the state that the wire communication connectors 300 and 310 are connected), a power wire 261 for supplying a power-supply voltage and a grounding wire 262 for supplying the ground voltage GND are connected to the load 201 via the wire communication connectors (300 and 310). Furthermore, a communication line 271 used for communication of input signals between the control unit 100 and the load 201 and a communication line 272 used for communication of output signals between the control unit 100 and the load 201 are connected to the load 201 via the wire communication connectors (300 and 310).

Moreover, in the example in FIG. 8, under the state that the unit section 76 is housed in the apparatus main-body unit 5 (while the wire communication connectors 300 and 310 are connected), a power wire 263 for supplying a power-supply voltage and a grounding wire 264 for supplying the ground voltage GND are connected to the load 202 via the wire communication connectors (300 and 310). Furthermore, a communication line 273 used for communication of input signals between the control unit 100 and the load 202 is connected to the load 202 via the wire communication connectors (300 and 310).

Moreover, in the example in FIG. 8, under the state that the unit section 76 is housed in the apparatus main-body unit 5 (while the wire communication connectors 300 and 310 are connected), a power wire 265 for supplying a power-supply voltage and a grounding wire 266 for supplying the ground voltage GND are connected to the load 203 via the wire communication connectors (300 and 310). Furthermore, a communication line 274 used for communication of output signals between the control unit 100 and the load 203 is connected to the load 203 via the wire communication connectors (300 and 310).

Moreover, in the example in FIG. 8, under the state that the unit section 76 is housed in the apparatus main-body unit 5 (while the wire communication connectors 300 and 310 are connected), a power wire 267 for supplying a power-supply voltage and a grounding wire 268 for supplying the ground voltage GND are connected to the load 206 via the wire communication connectors (300 and 310). Furthermore, a communication line 275 used for communication of input signals between the control unit 100 and the load 206 is connected to the load 206 via the wire communication connectors (300 and 310).

Each of the loads (the load 201, the load 202, the load 203, and the load 206) may be connected to both of the communication line used for communication of input signals and the communication line used for communication of output signals, may be connected to only the communication line used for communication of input signals, or may be connected to only the communication line used for communication of output signals, via the wire communication connectors (300 and 310). Furthermore, the power-supply voltage may be an arbitrary voltage and may not be directly connected to the loads via the wire communication connectors (300 and 310).

In contrast, as illustrated in FIG. 9, under the state that the unit section 76 is drawn from the apparatus main-body unit 5, the connection between the wire communication connectors 300 and 310 is disconnected and the wire connection between the control unit 100 and each of the load 201, the load 202, and the load 203 is disconnected. In this state, each of the load 201, the load 202, and the load 203 operates via the serial communication unit 210 (communicates with the control unit 100 via the serial communication unit 210).

Figure 10:
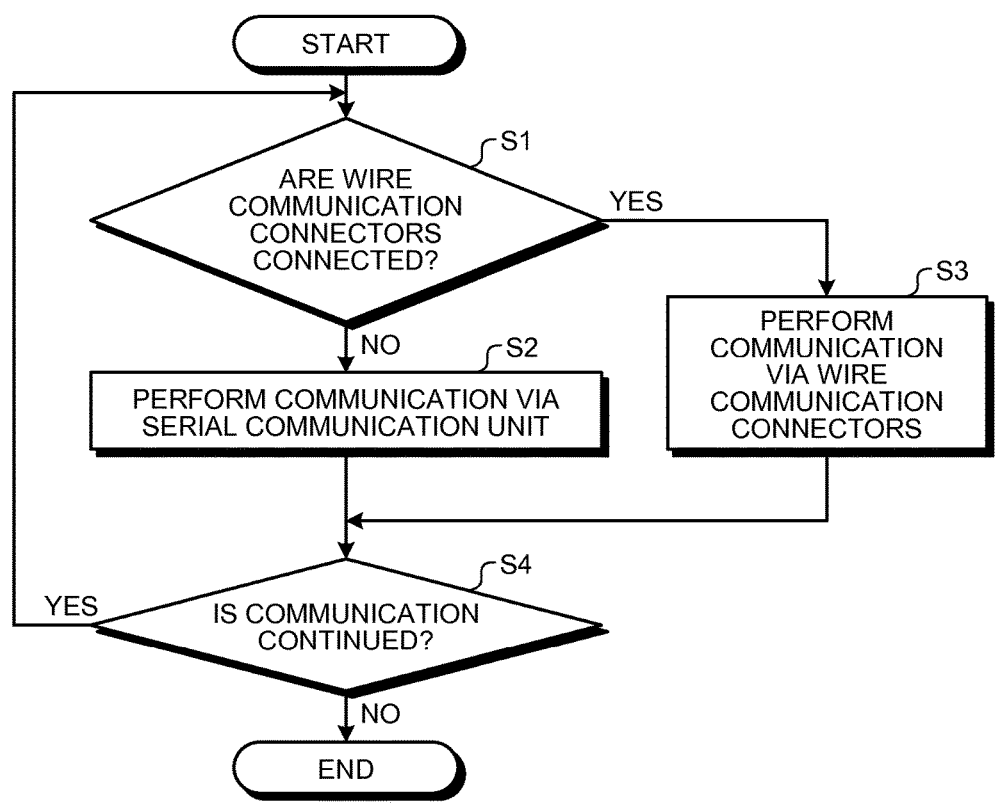
FIG. 10 is a flowchart illustrating an example of communication control by the control unit.

FIG. 10 is a flowchart illustrating an example of control of communication between the control unit 100 and each of the load 201, the load 202, and the load 203. First, the control unit 100 determines whether the wire communication connectors are connected to each other (Step S1). The connection state of the wire communication connectors may be detected physically by using an optical sensor, a switch, or the like, or may be detected based on whether communication is established by monitoring a communication status.

At Step S1, when determining that the wire communication connectors are not connected to each other (NO at Step S1), the control unit 100 enables communication with each of the load 201, the load 202, and the load 203 via the serial communication unit 210 (Step S2). In contrast, at Step S1, when determining that the wire communication connectors are connected to each other (YES at Step S1), the control unit 100 enables communication with each of the load 201, the load 202, and the load 203 via the wire communication connectors (300 and 310) (Step S3). Then, the process proceeds to Step S4. When the control unit 100 continues to communicate with each of the load 201, the load 202, and the load 203 (YES at Step S4), the above-described process from Step S1 is repeated. In contrast, when the control unit 100 ends the communication with each of the load 201, the load 202, and the load 203 (NO at Step S4), the process is terminated.

Even in the configuration as described above, it is possible to achieve the same advantageous effects as those of the first embodiment.

First Modification of Second Embodiment

Figure 11:
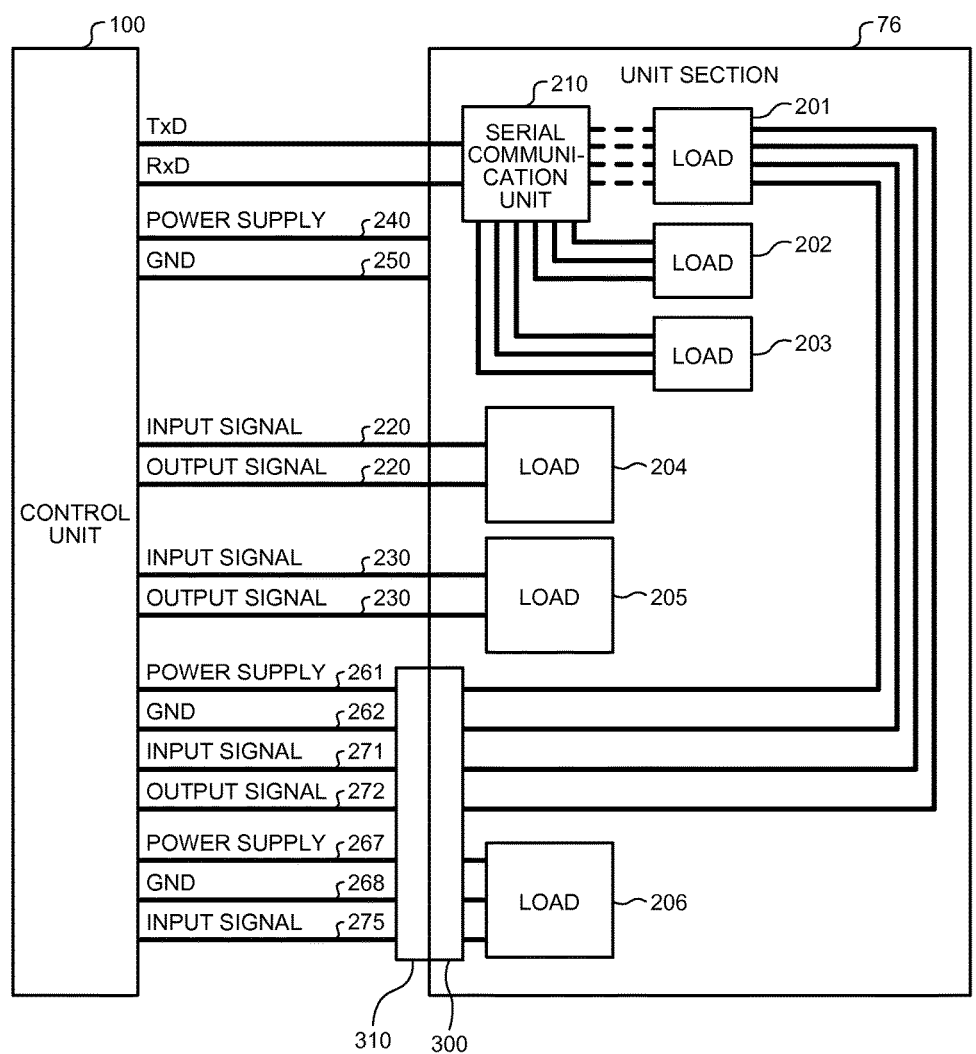
FIG. 11 is a schematic diagram illustrating an example of the connection configuration of the control unit and the unit section.
Figure 12:
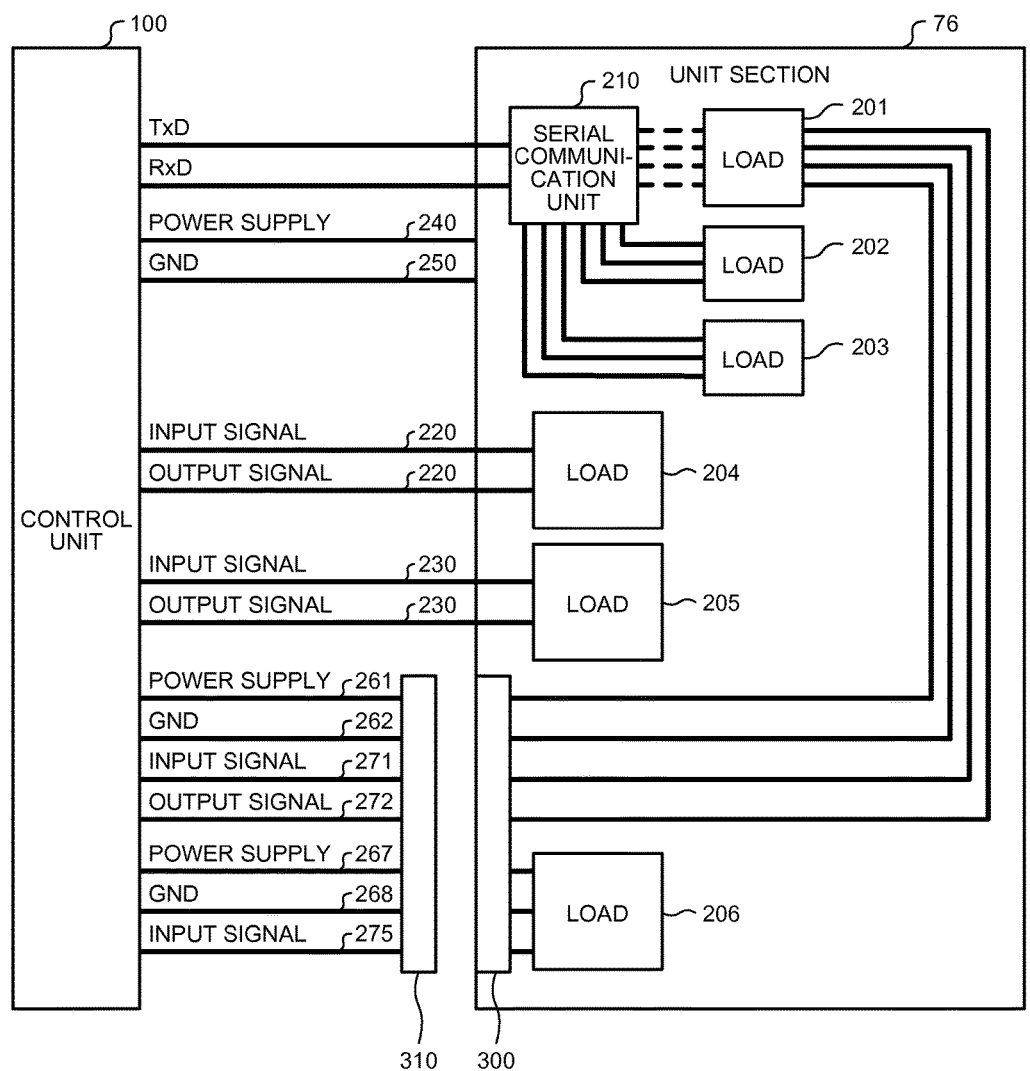
FIG. 12 is a schematic diagram illustrating an example of the connection configuration of the control unit and the unit section.

As illustrated in FIG. 11 and FIG. 12 for example, the wire communication connectors 300 and 310 may connect only the load 201 among the load 201, the load 202, and the load 203 to the control unit 100 with the wires under the state that the unit section 76 is housed in the apparatus main-body unit 5 (see FIG. 11), and disconnect the wire connection between the load 201 and the control unit 100 under the state that the unit section 76 is drawn from the apparatus main-body unit 5 (see FIG. 12).

Furthermore, in this example, the load 201 is also connected to the serial communication unit 210 similarly to the second embodiment. As illustrated in FIG. 11, under the state that the unit section 76 is housed in the apparatus main-body unit 5, the load 201 connected to the control unit 100 via the wire communication connectors (300 and 310) performs wire communication with the control unit 100 via the wire communication connectors (300 and 310) and does not perform serial communication via the serial communication unit 210. In contrast, as illustrated in FIG. 12, under the state that the unit section 76 is drawn from the apparatus main-body unit 5, the connection between the wire communication connectors 300 and 310 is disconnected and the wire connection between the load 201 and the control unit 100 is disconnected. In this state, the load 201 operates via the serial communication unit 210 (the load is connected to the control unit 100 via the serial communication by the serial communication unit 210).

Moreover, for example, the wire communication connectors 300 and 310 may connect only the load 202 or the load 203 to the control unit 100 with the wires under the state that the unit section 76 is housed in the apparatus main-body unit 5, and disconnect the wire connection between the load 202 or the load 203 and the control unit 100 under the state that the unit section 76 is drawn from the apparatus main-body unit 5. Furthermore, for example, the wire communication connectors 300 and 310 may connect any two of the load 201, the load 202, and the load 203 to the control unit 100 with the wires under the state that the unit section 76 is housed in the apparatus main-body unit 5, and disconnect the wire connection between the two of the loads and the control unit 100 while the unit section 76 is drawn from the apparatus main-body unit 5.

Namely, it is sufficient to include a wire communication unit (in this example, the wire communication connectors 300 and 310) that causes at least one of the first load and the second load being connected to the serial communication unit 210 to be connected to the control unit 100 with a wire under the state that the unit section 76 is housed in the apparatus main-body unit 5. Furthermore, it is sufficient to cause one of the first load and the second load being connected to the control unit 100 via the wire communication unit to perform wire communication with the control unit 100 and not to perform serial communication under the state that the unit section 76 is housed in the apparatus main-body unit 5.

Second Modification of Second Embodiment

For example, any of the load 201, the load 202, and the load 203 as described above may serve as a detecting unit that detects a state of the unit section 76. As described above, the unit section 76 includes a conveying unit (such as the main conveying path 70, the sheet discharge path 60, or the reverse conveying path 73) that conveys a recording medium (sheet). In this example, the detecting unit has a function to detect a jam of a recording medium. In the explanation below, the detecting unit may be referred to as a "sensor S". In this example, the sensor S may correspond to a "second load" in the appended claims. Furthermore, the wire communication connectors (300 and 310) as described above connect the control unit 100 and at least the sensor S with a wire under the state that the unit section 76 is housed in the apparatus main-body unit 5. Moreover, under the state that the unit section 76 is drawn from the apparatus main-body unit 5, the wire connection between the control unit 100 and the sensor S via the wire communication connectors (300 and 310) is disconnected and the sensor S communicates with the control unit 100 via the serial communication unit 210.

Furthermore, in the present embodiment, the serial communication unit 210 has a function to receive a signal from the sensor S. When the sensor S detects a jam, monitoring of the sensor S performed via the wire communication connectors (300 and 310) by the control unit 100 is switched to monitoring of the sensor S performed via the serial communication unit 210. This will be explained in detail below.

Configuration for Error Detection

Figure 13:
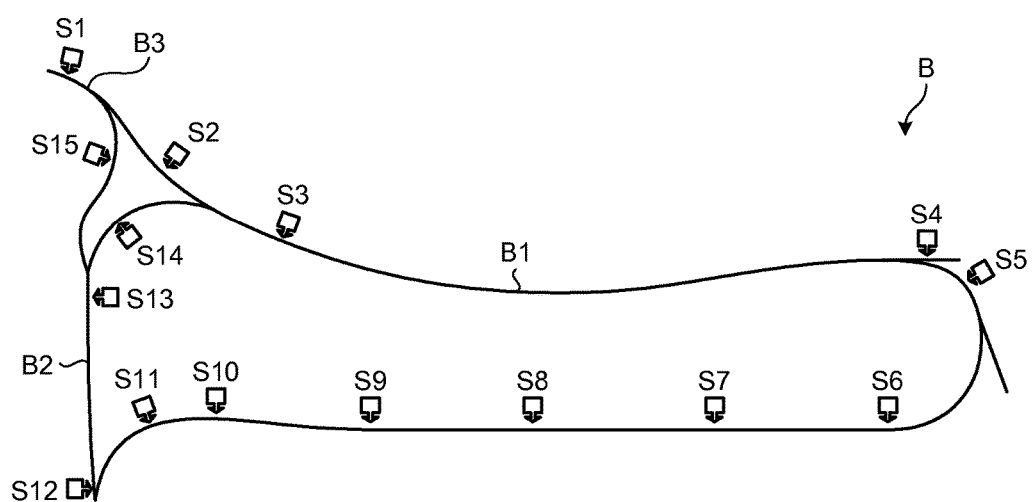
FIG. 13 is a diagram illustrating an example of a configuration for error detection according to a modification.

FIG. 13 is a diagram illustrating an example of a configuration for error detection according to the present modification. In FIG. 13, paper jam detection is illustrated as an example of the error detection.

A conveying path B included in the unit section 76 according to the present embodiment includes a main conveying path B1, a reverse conveying path B2, and a sheet discharge path B3. For example, when images are formed on both sides of a sheet (in the case of duplex printing), the sheet is conveyed as described below. The sheet is conveyed along the main conveying path B1, reversed in the reverse conveying path B2, delivered to the main conveying path B1 again to perform duplex printing, and discharged via the sheet discharge path B3.

Furthermore, on the conveying path B according to the present embodiment, multiple sensors S1 to S15 (hereinafter, may be collectively referred to as the "sensor S") for detecting a paper jam are provided along the conveying path. The sensor S according to the present embodiment includes, for example, a sheet discharge sensor, a sheet discharge relay sensor, a sheet discharge reverse sensor, a reverse entrance sensor, a reverse exit sensor, a duplex conveyance sensor, a duplex reverse sensor, a duplex entrance sensor, a duplex exit sensor, a main-body relay sensor, a registration sensor, and a conveyance-tank sheet detection sensor. The sensor S determines that a paper jam (sheet jam) has occurred (detects an error) when the sheet does not pass through a detection area (sensing area) within a time set in advance (within a predetermined time). Therefore, in the image forming apparatus 1 according to the present modification, it becomes possible to detect various errors, such as a paper jam, that have occurred in the main-body. Incidentally, the number and the arrangement positions of the sensors S, the number of types of the conveying path B, and the arrangement position of the conveying path B are set appropriately.

Configuration for Error Notification

In the present modification, while details are not illustrated in the drawings, multiple light emitting diodes (LEDs) 600 that notify a user of a position of occurrence of a paper jam are provided around the front cover 6 illustrated in FIG. 2. When the sensor S detects a paper jam, the LEDs 600 are sequentially turned on in accordance with the procedure to enable a user to remove the paper jam that has occurred (the procedure to solve an error that has occurred). Therefore, in the image forming apparatus 1 according to the present modification, it becomes possible to notify the user of the position of occurrence of an error, such as a paper jam, in the main-body. The number and the arrangement positions of the LEDs 600 are set appropriately.

Connection Configuration of the Unit Section 76 and the Apparatus Main-Body Unit 5

Figure 14A:
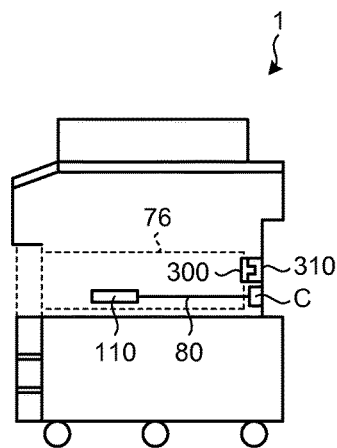
FIGS. 14A and 14B are diagrams illustrating an example of a connection configuration of the unit section and the apparatus main-body unit according to the modification.
Figure 14B:
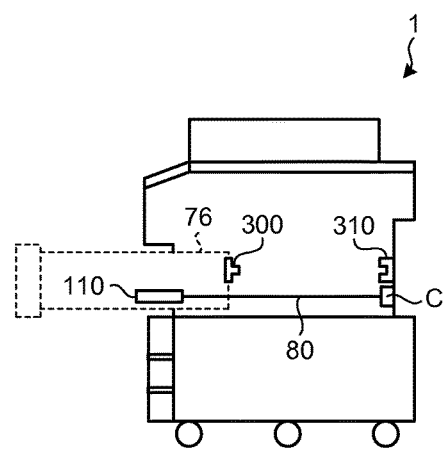

FIGS. 14A and 14B are diagrams illustrating an example of a connection configuration of the unit section 76 and the apparatus main-body unit 5 according to the present modification. FIG. 14A is a schematic diagram illustrating a state in which the unit section 76 is housed in the apparatus main-body unit 5. FIG. 14B is a schematic diagram illustrating a state in which the unit section 76 is drawn from the apparatus main-body unit 5 without being housed in the apparatus main-body unit 5.

As illustrated in FIG. 14A, under the state that the unit section 76 is not being drawn from the apparatus main-body unit 5, the unit section 76 and the apparatus main-body unit 5 are connected to each other via the wire communication connectors (300 and 310). In this example, the wire communication connectors (300 and 310) are configured as drawer connectors. In this state, the unit section 76 and the apparatus main-body unit 5 (the control unit 100) are enabled to communicate with each other (enabled to perform parallel communication) via the wire communication connectors (300 and 310). In contrast, as illustrated in FIG. 14B, under the state that the unit section 76 is drawn from the apparatus main-body unit 5, the connection via the wire communication connectors (300 and 310) is disconnected (cut off), and the unit section 76 and the apparatus main-body unit 5 are connected via a bundled wire 80. In this example, the bundled wire 80 is a bundle of the serial communication lines TxD and RxD, the communication lines 220, and the communication lines 230 illustrated in FIG. 8. In this state, the unit section 76 and the apparatus main-body unit 5 (the control unit 100) are enabled to communicate with each other (enabled to perform serial communication) via the serial communication unit 210.

As described above, in the image forming apparatus 1 according to the present modification, even when the unit section 76 is drawn from the apparatus main-body unit 5 upon occurrence of an error for example, the electrical connection between the unit section 76 and the apparatus main-body unit 5 is maintained.

Furthermore, the unit section 76 according to the present modification includes a drawer-unit control substrate 110 including a control device, such as a CPU. The drawer-unit control substrate 110 according to the present modification is connected to a connector C included in the apparatus main-body unit 5 via the bundled wire 80. Furthermore, the drawer-unit control substrate 110 controls the sensor S that detects an error or the LEDs 600 that notify the position of occurrence of an error under the state that the unit section 76 is drawn from the apparatus main-body unit 5.

Therefore, in the image forming apparatus 1 according to the present modification, even when the unit section 76 is drawn from the apparatus main-body unit 5 upon occurrence of an error for example, it becomes possible to transmit detection information (a detection result) obtained by the sensor S to the control unit 100 (CPU) of the apparatus main-body unit 5 via the bundled wire 80. Furthermore, in the image forming apparatus 1 according to the present modification, it is possible to notify the position of occurrence of the error in the unit section 76 by turning on the LEDs 600.

Functions

Control functions of the image forming apparatus 1 according to the present modification will be explained below. The image forming apparatus 1 according to the present modification includes three communication paths. Specifically, a first communication path is provided by the wire communication connectors (300 and 310) that connect the sensor S of the unit section 76 and the control unit 100 to enable parallel communication and that disconnect (cut off) the connection when the unit section 76 is drawn from the apparatus main-body unit 5. Furthermore, a second communication path is provided that connect the sensor S of the unit section 76 and the control device of the unit section 76 to enable communication. Moreover, a third communication path is provided by the bundled wire 80 that connects the control unit 100 of the apparatus main-body unit 5 of the image forming apparatus 1 and the control device of the unit section 76 to enable serial communication and that does not disconnect (cut off) the connection even when the unit section 76 is drawn from the apparatus main-body unit 5. The image forming apparatus 1 according to the present modification performs a control process as described below by using the communication paths as described above. Specifically, under the state that the unit section 76 is housed in the apparatus main-body unit 5, the unit section 76 and the apparatus main-body unit 5 perform parallel communication via the first communication path, and the control unit 100 monitors the sensor S (performs sensor control). In contrast, under the state that the unit section 76 is drawn from the apparatus main-body unit 5 instead of being housed in the apparatus main-body unit 5, the unit section 76 and the sensor S perform communication via the second communication path as will be described later. Furthermore, the unit section 76 and the apparatus main-body unit 5 perform serial communication via the third communication path, and the control device of the unit section 76 monitors the sensor S (performs sensor control). The image forming apparatus 1 according to the present modification has such control functions.

In the conventional connection method, it has been difficult to reduce the area occupied by the bundled wire 80 connecting the unit section 76 and the apparatus main-body unit 5 in the main-body and simultaneously deal with the responsiveness to a control process for error detection or error notification between the unit section 76 and the apparatus main-body unit 5.

Therefore, in the image forming apparatus 1 according to the present modification, the sensor control is performed on the main-body side via the parallel communication under the state that the unit section 76 is housed in the apparatus main-body unit 5. In contrast, in the image forming apparatus 1 according to the present modification, the sensor control is performed on the unit section 76 side via the serial communication under the state that the unit section 76 is not housed in the apparatus main-body unit 5.

Therefore, the image forming apparatus 1 according to the present modification provides an environment, in which the sensor control via the first communication path is switched to the sensor control via the second communication path when the image forming apparatus 1 detects an error. Consequently, the image forming apparatus 1 according to the present modification can ensure a space in the main-body by employing the serial communication via the bundled wire 80 having the smaller number of cores as the communication for the sensor control. Furthermore, the image forming apparatus 1 according to the present modification can deal with the responsiveness needed for a control process between the unit section 76 and the apparatus main-body unit 5 by employing the parallel communication via the wire communication connectors (300 and 310) as the communication for the sensor control.

Figure 15:
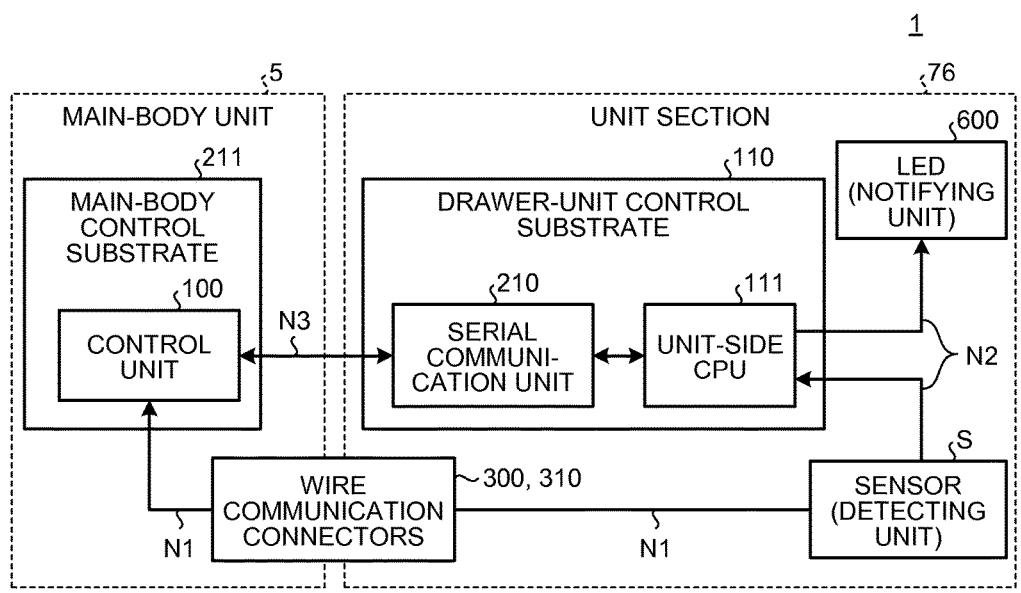
FIG. 15 is a diagram illustrating an example of a functional configuration of an image forming apparatus according to the modification.

A configuration and operation to implement the control functions of the image forming apparatus 1 according to the present modification will be described below. FIG. 15 is a diagram illustrating an example of a configuration to implement the control functions of the image forming apparatus 1 according to the present modification.

As illustrated in FIG. 15, the image forming apparatus 1 according to the present modification has the functions implemented by the apparatus main-body unit 5 of the image forming apparatus 1 and the functions implemented by the unit section 76.

Functions of the Apparatus Main-Body Unit 5 of the Image Forming Apparatus 1

The apparatus main-body unit 5 of the image forming apparatus 1 according to the present modification includes a main-body control substrate 211 including the control unit 100. The main-body control substrate 211 according to the present modification is connected to the sensor S of the unit section 76 via a first communication path (first communication means) N1 that enables parallel communication. The first communication path N1 according to the present modification is a communication path implemented by the wire communication connectors (300 and 310) that are disconnected (cut off) when the unit section 76 is drawn from the apparatus main-body unit 5. The control unit 100 according to the present modification receives error detection information transmitted by the sensor S of the unit section 76 via the first communication path N1 while the unit section 76 is housed in the apparatus main-body unit 5. Namely, under the state that the unit section 76 is housed in the apparatus main-body unit 5, the control unit 100 performs sensor control (monitoring of the sensor S), such as error detection or error notification, including a process on error detection information or error removal information.

Furthermore, the main-body control substrate 211 according to the present modification is connected to the drawer-unit control substrate 110 via a third communication path (third communication means) N3 that enables serial communication. The third communication path N3 according to the present modification is a communication path implemented by the bundled wire 80 that is not disconnected (cut off) even when the unit section 76 is drawn from the apparatus main-body unit 5. The control unit 100 according to the present modification receives error removal information transmitted by the drawer-unit control substrate 110 via the third communication path N3 while the unit section 76 is drawn from the apparatus main-body unit 5 instead of being housed in the apparatus main-body unit 5.

Functions of the Unit Section 76

The unit section 76 according to the present modification includes the drawer-unit control substrate 110 including a unit-side CPU (second control unit) 111 and the serial communication unit 210, and includes the LED 600, the sensor (detecting unit) S, and the like. The unit-side CPU 111 according to the present modification corresponds to the control device of the unit section 76. Furthermore, the LED 600 according to the present modification corresponds to a notification device that notifies a user of a position of occurrence of an error, such as a paper jam, and the sensor S according to the present modification corresponds to a detection device that detects an error.

The drawer-unit control substrate 110 according to the present modification is connected to the LED 600 and the sensor S via a second communication path (second communication means) N2. The second communication path N2 according to the present modification is a communication path implemented by a bundled wire. Incidentally, the second communication path N2 is a communication path that enables communication by using either a parallel communication method or a serial communication method. Furthermore, in the present embodiment, an example is illustrated in which the second communication path N2 is implemented by the bundled wire; however, the present invention is not limited to this example. The second communication path N2 may not be the bundled wire. The unit-side CPU 111 according to the present modification controls the sensor S and the LED 600 under the state that the unit section 76 is drawn from the apparatus main-body unit 5. Namely, while the unit section 76 is drawn from the apparatus main-body unit 5 instead of being housed in the apparatus main-body unit 5, the unit-side CPU 111 performs sensor control (monitoring of the sensor S), such as error detection or error notification, including a process on error detection information or error removal information. In this case, the unit-side CPU 111 processes the error detection information or the error removal information, and transfers the processed information to the serial communication unit 210. As a result, the serial communication unit 210 according to the present modification transmits the processed information to the control unit 100 via the third communication path N3. From a different perspective view, the serial communication unit 210 has a function to receive a signal from the sensor S. Furthermore, the unit-side CPU 111 turns on and off the LED 600 corresponding to a position of occurrence of an error based on the error detection information or the error removal information.

Control Operation Performed by the Image Forming Apparatus 1

The operation with the control functions of the image forming apparatus 1 according to the present modification (cooperation between the functional units) will be explained below with reference to a flowchart.

FIG. 16 is a flowchart illustrating the flow of a control process according to the present modification. In part (A) in FIG. 16, an example of a control process performed by the control unit 100 of the apparatus main-body unit 5 is illustrated. In part (B) in FIG. 16, a control process performed by the unit-side CPU 111 is illustrated. As illustrated in FIG. 16, in the image forming apparatus 1 according to the present modification, the synchronous process for the sensor control via the communication paths is performed between the control unit 100 and the unit-side CPU 111.

First, the control unit 100 starts control (Step S1). At this time, the unit section 76 is being housed in the apparatus main-body unit 5.

Subsequently, the control unit 100 monitors a detection result obtained by the sensor S corresponding to the duplex conveyance sensor (Step S2). At this time, the control unit 100 monitors the detection result obtained by the sensor S via the first communication path N1 that enables parallel communication by the wire communication connectors (300 and 310).

Then, the control unit 100 determines whether a paper jam is detected based on the detection result (Step S3). At this time, while the paper jam is not being detected (NO at Step S3), the control unit 100 returns the process to Step S2 and continues to monitor the detection result.

If the paper jam is detected (YES at Step S3), the control unit 100 transfers the control process to the unit-side CPU 111. At this time, the control unit 100 transmits a control start command (an instruction command to start monitoring the sensor S) to the serial communication unit 210 of the unit section 76 via the third communication path N3. Accordingly, the unit-side CPU 111 receives the control start command transferred by the serial communication unit 210, and receives the instruction command to start monitoring the sensor S.

Therefore, in the image forming apparatus 1 according to the present modification, when the paper jam is detected, the unit section 76 is drawn from the apparatus main-body unit 5 to remove the paper jam, and therefore, the subject that controls the error detection is changed from the control unit 100 to the unit-side CPU 111.

In response to this, the unit-side CPU 111 starts control (Step S4).

Subsequently, the unit-side CPU 111 monitors a detection result obtained by the sensor S corresponding to the duplex conveyance sensor (Step S5). At this time, the unit-side CPU 111 can monitor the detection result obtained by the sensor S via the second communication path N2 and can transmit the detection result to the control unit 100 via the third communication path N3. As described above, in the image forming apparatus 1 according to the present embodiment, when a paper jam is detected, monitoring of the sensor S performed via the first communication path N1 is switched to monitoring of the sensor S performed via the second communication path N2 and the third communication path N3. Namely, when the sensor S detects a paper jam, monitoring of the sensor S performed via the wire communication connectors (300 and 310) by the control unit 100 is switched to monitoring of the sensor S performed via the serial communication unit 210. Furthermore, from a different perspective view, when the sensor S detects a paper jam, the control unit 100 starts monitoring of the sensor S via the serial communication unit 210.

Subsequently, the unit-side CPU 111 turns on a main-body drawer LED 600 (Step S6). In this case, the unit-side CPU 111 transmits a turn-on command to the main-body drawer LED 600 arranged on the front surface of the front cover 6, via the second communication path N2. As described above, the image forming apparatus 1 turns on the corresponding LED 600 to notify a user of occurrence of the paper jam.

Subsequently, the unit-side CPU 111 determines whether the unit section 76 is drawn from the apparatus main-body unit 5 (Step S7). At this time, the unit-side CPU 111 determines whether the unit section 76 is drawn from the apparatus main-body unit 5 based on a determination result on whether the connection between the wire communication connector 300 on the unit section 76 side and the wire communication connector 310 on the apparatus main-body unit 5 side is disconnected (cut off). While the unit section 76 is not being drawn from the apparatus main-body unit 5 (while the unit section 76 is housed in the apparatus main-body unit 5; NO at Step S7), the unit-side CPU 111 repeats the process at Step S7 to monitor a change in the storage state of the unit section 76.

If the unit section 76 is drawn from the apparatus main-body unit 5 (YES at Step S7), the unit-side CPU 111 turns off the main-body drawer LED 600 (Step S8), and turns on the LED 600 arranged on a horizontal conveyance guide plate (not illustrated) (Step S9). At this time, the unit-side CPU 111 transmits a turn-off command to the main-body drawer LED 600 via the second communication path N2, and transmits a turn-on command to the LED 600 on the horizontal conveyance guide plate. As described above, in the image forming apparatus 1, the corresponding LED 600 is turned on in accordance with the procedure to remove the paper jam to thereby notify a user of the position of occurrence of the paper jam.

Subsequently, the unit-side CPU 111 determines whether the paper jam that has occurred is removed (Step S10). At this time, the unit-side CPU 111 determines whether the paper jam that has occurred is removed based on the detection result received from the sensor S via the second communication path N2. While the paper jam that has occurred is not removed (NO at Step S10), the unit-side CPU 111 repeats the process at Step S10 and continues to monitor a change in a paper jam removal state.

If the paper jam that has occurred is removed (YES at Step S10), the unit-side CPU 111 turns off the LED 600 on the horizontal conveyance guide plate (Step S11). At this time, the unit-side CPU 111 transmits a turn-off command to the LED 600 on the horizontal conveyance guide plate via the second communication path N2. As described above, the image forming apparatus 1 according to the present modification turns off the LED 600 corresponding to the position of occurrence of the paper jam to thereby notify the user that the paper jam that has occurred is removed.

At this time, the unit-side CPU 111 processes information on removal of the paper jam, and transfers the processed information to the serial communication unit 210. Therefore, the control unit 100 of the apparatus main-body unit 5 receives the processed information transmitted by the serial communication unit 210 via the third communication path N3, and receives a notice indicating that the paper jam is removed. The reception data at this time is reflected in, for example, contents displayed on a display device (not illustrated) included in the image forming apparatus 1.

Subsequently, the unit-side CPU 111 determines whether the unit section 76 is housed in the apparatus main-body unit 5 (Step S12). At this time, the unit-side CPU 111 determines whether the unit section 76 is housed in the apparatus main-body unit 5 based on a determination result on whether the wire communication connector 300 on the unit section 76 side and the wire communication connector 310 on the apparatus main-body unit 5 side are connected. While the unit section 76 is not housed in the apparatus main-body unit 5 (while the unit section 76 is drawn from the apparatus main-body unit 5; NO at Step S12), the unit-side CPU 111 repeats the process at Step S12 to monitor a change in the storage state of the unit section 76.

If the unit section 76 is housed in the apparatus main-body unit 5 (YES at Step S12), the unit-side CPU 111 determines whether requested image processing is executable (Step S13). At this time, the unit-side CPU 111 determines whether the requested image processing is executable based on, for example, presence or absence of other errors that have occurred. While the requested image processing is not executable (NO at Step S13), the unit-side CPU 111 repeats the process at Step S13 to monitor a change in an image processing executable state.

If the requested image processing is executable (YES at Step S13), the unit-side CPU 111 transfers the control process to the control unit 100 of the apparatus main-body unit 5. At this time, the unit-side CPU 111 transmits a control resuming command (an instruction command to start monitoring the sensor S) to the serial communication unit 210 via the third communication path N3. Therefore, the control unit 100 of the apparatus main-body unit 5 receives the control resuming command transferred by the serial communication unit 210 of the unit section 76, and receives the instruction command to start monitoring the sensor S. From a different perspective view, when the paper jam detected by the sensor S is removed, the serial communication unit 210 instructs, via the serial communication, the control unit 100 to start monitoring the sensor S via the wire communication connectors (300 and 310).

Therefore, in the image forming apparatus 1 according to the present modification, when the paper jam that has occurred is removed, the unit section 76 is housed in the apparatus main-body unit 5, and therefore, the subject that controls the error detection is changed from the unit-side CPU 111 to the control unit 100.

In response to this, the control unit 100 of the apparatus main-body unit 5 starts control again (Step S14), and monitors a detection result obtained by the sensor S serving as the duplex conveying sensor (Step S15). As described above, in the image forming apparatus 1 according to the present modification, when the paper jam that has occurred is removed, monitoring of the sensor S performed via the second communication path N2 and the third communication path N3 is switched to monitoring of the sensor S performed via the first communication path N1. Namely, when the paper jam detected by the sensor S is removed, monitoring of the sensor S performed via the serial communication unit 210 is switched to monitoring of the sensor S performed via the wire communication connectors by the control unit 100 (300 and 310).

As described above, in the image forming apparatus 1 according to the present modification, under the state that the unit section 76 is housed in the apparatus main-body unit 5, the main-body side performs the sensor control via the parallel communication. In contrast, in the image forming apparatus 1 according to the present modification, under the state that the unit section 76 is not housed in the apparatus main-body unit 5, the unit section 76 side performs the sensor control via the serial communication.

Overview of Modification

As described above, the image forming apparatus 1 according to the present modification includes three communication paths. Specifically, the first communication path N1 is provided by the wire communication connectors (300 and 310) that connect the sensor S of the unit section 76 and the control unit 100 of the apparatus main-body unit 5 to enable parallel communication and that disconnect (cut off) the connection when the unit section 76 is drawn from the apparatus main-body unit 5. Furthermore, the second communication path N2 is provided by the bundled wire that connects the sensor S of the unit section 76 and the unit-side CPU 111 to enable communication. Moreover, the third communication path N3 is provided by the bundled wire 80 that connect the control unit 100 of the apparatus main-body unit 5 of the image forming apparatus 1 and the control device of the unit section 76 to enable serial communication and that does not disconnect (cut off) the connection even when the unit section 76 is drawn from the apparatus main-body unit 5. The image forming apparatus 1 according to the present modification performs a control process as described below by using the communication paths as described above. Specifically, while the unit section 76 is housed in the apparatus main-body unit 5, the unit section 76 and the apparatus main-body unit 5 perform parallel communication via the first communication path N1, and the control unit 100 of the apparatus main-body unit 5 controls error detection and error notification. In contrast, while the unit section 76 is drawn from the apparatus main-body unit 5 instead of being housed in the apparatus main-body unit 5, the unit section 76 and the sensor S perform communication via the second communication path N2. Furthermore, the unit section 76 and the apparatus main-body unit 5 perform serial communication via the third communication path N3, and the unit-side CPU 111 of the unit section 76 controls error detection and error notification.

Therefore, the image forming apparatus 1 according to the present modification provides an environment, in which the sensor control via the parallel communication and the sensor control via the serial communication are switched from one to the other depending on a change in the storage state of the unit section 76 with respect to the image forming apparatus 1. As a result, the image forming apparatus 1 according to the present modification can ensure a space in the main-body by employing the serial communication via the bundled wire 80 having the smaller number of cores as the communication for the sensor control. Furthermore, the image forming apparatus 1 according to the embodiment can deal with the responsiveness needed for the control process between the unit section 76 and the apparatus main-body unit 5 by employing the parallel communication via the wire communication connectors (300 and 310) formed of drawer connectors as the communication for the sensor control.

Incidentally, while an example is explained in the modification that the drawer connectors are used as the wire communication connectors (300 and 310), the present invention is not limited to this example. The wire communication connectors (wire communication unit) according to the present modification may be any connection components that connect the sensor S of the unit section 76 and the control unit 100 of the apparatus main-body unit 5 to enable parallel communication and that disconnect the connection when the unit section 76 is drawn from the apparatus main-body unit 5.

While the embodiments of the present invention have been explained above, the embodiments are described by way of example and not intended to limit the scope of the invention. The present invention is not limited to the embodiments as described above, and may be embodied in various forms by modifying components within the scope of the invention. Furthermore, various modifications may be embodied by appropriately combining multiple components described in the embodiments. For example, it may be possible to remove any of the components described in the embodiments. Moreover, the embodiments and the modifications as described above may be arbitrarily combined.

In the embodiments as described above, an image forming apparatus that forms an image on a recording medium is explained as an example of the electronic device to which the present invention is applied; however, the present invention is not limited to this example. The present invention may be applied to arbitrary types of electronic devices.

The programs executed by the control unit 100 may be provided by being recorded in a computer-readable recording medium, such as a compact disc (CD)-ROM, a flexible disk (FD), a compact disc-recordable (CD-R), or a digital versatile disk (DVD), in a computer-installable or a computer-executable file format.

Furthermore, the programs executed by the control unit 100 may be provided by being stored in a computer connected to a network, such as the Internet, and by being downloaded via the network. The programs executed by the control unit 100 may be provided or distributed via a network, such as the Internet.

According to an embodiment of the present invention, it becomes possible to ensure a space in the main-body and simultaneously deal with the responsiveness needed for a control process between the unit and the main-body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
   a processor configured to control operation of the electronic device;
   a drawer that is drawable from a main body of the electronic device, the drawer including multiple loads mounted thereon; and
   a connector that connects between the loads and the processor in a state that the drawer is housed in the main body, and disconnects the connection in a state that the drawer is drawn out from the main body;
   wherein the drawer includes a circuitry, the circuitry being connected to the loads and enabling serial communication with the processor in the state that the drawer is drawn out from the main body.

2. The electronic device according to claim 1, wherein:
   the drawer includes another load connected to a communication line for communication with the controller in both the state that the drawer is housed in the main body and the state that the drawer is drawn a distance away from the main body.

3. The electronic device according to claim 2, further comprising a bundled wire, in which electrical wires for connecting the processor and the drawer are bundled, wherein the communication line is arranged in a center of the bundled wire.

4. The electronic device according to claim 1, wherein:
   the circuitry is configured to convert serial signals received from the processor into parallel signals, and to supply the parallel signals to the loads.

5. The electronic device according to claim 1, wherein one of the loads is a detector to detect a state of the drawer.

6. The electronic device according to claim 5, wherein the drawer includes a conveying unit to convey a recording medium, and
   the detector detects a jam of the recording medium.

7. The electronic device according to claim 6, wherein the circuitry has a function to receive a signal from the detector, and
   when the detector detects the jam of the recording medium, monitoring of the detector via the connector by the processor is switched to monitoring of the detector via the circuitry.

8. The electronic device according to claim 6, wherein the circuitry has a function to receive a signal from the detector, and
   responsive to the detector detecting the jam of the recording medium, the processor starts monitoring the detector via the circuitry.

9. The electronic device according to claim 6, wherein the circuitry has a function to receive a signal from the detector, and
   responsive to a determination that the jam detected by the detector is removed, monitoring of the detector via the circuitry by the processor is switched to monitoring of the detector via the connector.

10. The electronic device according to claim 6, wherein the circuitry has a function to receive a signal from the detector, and
    responsive to a determination that the jam detected by the detector is removed, the circuitry instructs the processor to start monitoring the detector via the connector.

11. The electronic device according to claim 1, wherein the connector is a drawer connector.

12. The electronic device according to claim 1, further comprising a bundled wire, in which electrical wires for connecting the processor and the drawer are bundled, wherein a power wire for supplying a power-supply voltage and a grounding wire for supplying a ground voltage are arranged in a center of the bundled wire.

13. The electronic device according to claim 1, further comprising a bundled wire, in which electrical wires for connecting the processor and the drawer are bundled, wherein the serial communication line used by the circuitry is arranged in a center of the bundled wire.

14. An image forming apparatus that forms an image on a recording medium, the image forming apparatus comprising:
    a processor configured to control operation of the image forming apparatus; and
    a drawer that is drawable from a main body of the image forming apparatus, the drawer including multiple loads mounted thereon; and
    a connector that connects between the processor in a state that the drawer is housed in the main body, and disconnects the connection via the connector in a state that the drawer is drawn out from the main body;
    wherein the drawer includes a circuitry, the circuitry being connected to the loads and enabling serial communication with the processor in the state that the drawer is drawn out from the main body.

15. A control method performed in an electronic device that includes:
    a processor configured to control operation of the electronic device; and
    a drawer that is drawable from a main body of the electronic device and that includes a conveying unit for conveying a recording medium and a load to detect a jam of the recording medium,
    the method comprising:
    switching, when the load detects the jam of the recording medium, from monitoring of the load performed via a connector by the processor to monitoring of the load performed via a circuitry, the connector being configured to connect the processor and the load with a wire under a state that the drawer is housed in the main body, and the circuitry being configured to enable serial communication with the processor under a state that the drawer is drawn out from the main body.

* * * * *